(12) United States Patent
Cussigh et al.

(10) Patent No.: US 11,584,396 B2
(45) Date of Patent: Feb. 21, 2023

(54) METHOD, SYSTEM, AND VEHICLE FOR PREPARING AN ENERGY FORECAST AND DETERMINING AN OPTIMIZED DRIVING BEHAVIOR WITH RESPECT TO THE ENERGY FORECAST

(71) Applicant: Bayerische Motoren Werke Aktiengesellschaft, Munich (DE)

(72) Inventors: Maximilian Cussigh, Munich (DE); Harald Hofmeier, Eching (DE); Tobias Straub, Munich (DE); Mark Van Gelikum, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 141 days.

(21) Appl. No.: 16/969,038

(22) PCT Filed: Mar. 1, 2019

(86) PCT No.: PCT/EP2019/055137
§ 371 (c)(1),
(2) Date: Aug. 11, 2020

(87) PCT Pub. No.: WO2019/174932
PCT Pub. Date: Sep. 19, 2019

(65) Prior Publication Data
US 2021/0031803 A1    Feb. 4, 2021

(30) Foreign Application Priority Data

Mar. 15, 2018 (DE) .................... 10 2018 203 975.5

(51) Int. Cl.
*B60W 60/00* (2020.01)
*B60W 40/09* (2012.01)
(Continued)

(52) U.S. Cl.
CPC ........ *B60W 60/0023* (2020.02); *B60W 40/09* (2013.01); *B60W 60/0011* (2020.02);
(Continued)

(58) Field of Classification Search
None
See application file for complete search history.

(56) References Cited

U.S. PATENT DOCUMENTS 5,539,399 A    7/1996  Takahira et al.
10,048,082 B2  8/2018  Meyer et al.
(Continued)

FOREIGN PATENT DOCUMENTS

DE    10 2007 059 121 A1    6/2009
DE    10 2010 007 851 A1    12/2010
(Continued)

OTHER PUBLICATIONS

International Search Report (PCT/ISA/210) issued in PCT Application No. PCT/EP2019/055137 dated Jun. 24, 2019 with English translation (five pages).

(Continued)

*Primary Examiner* — James J Lee
*Assistant Examiner* — David Hatch
(74) *Attorney, Agent, or Firm* — Crowell & Moring LLP

(57) ABSTRACT

A driver assistance method for a vehicle includes the steps of establishing an energy prediction for a route on the basis of an anticipated driver behavior, determining a driving behavior which is optimized with regard to the energy prediction, and outputting an action recommendation on the basis of the optimized driving behavior.

14 Claims, 2 Drawing Sheets

(51) Int. Cl.
*G01C 21/34* (2006.01)
*G01C 21/36* (2006.01)
(52) U.S. Cl.
CPC ..... *G01C 21/3407* (2013.01); *G01C 21/3469* (2013.01); *G01C 21/3691* (2013.01); *B60W 2520/105* (2013.01)

(56) References Cited

U.S. PATENT DOCUMENTS

| | | | |
|---|---|---|---|
| 10,678,234 B2* | 6/2020 | Sun | G01C 21/3469 |
| 2010/0138142 A1 | 6/2010 | Pease | |
| 2012/0053772 A1 | 3/2012 | Lu | |
| 2013/0166123 A1 | 6/2013 | Donald, III et al. | |
| 2014/0236466 A1* | 8/2014 | Doron | G06Q 10/06 701/123 |
| 2014/0277835 A1* | 9/2014 | Filev | G01C 21/3469 701/2 |
| 2016/0097652 A1 | 4/2016 | Liu et al. | |
| 2016/0303979 A1 | 10/2016 | Heyse | |
| 2018/0029500 A1 | 2/2018 | Katanoda | |
| 2018/0045526 A1* | 2/2018 | Trancik | G01C 21/3469 |
| 2018/0186360 A1* | 7/2018 | Jo | B60W 20/11 |
| 2018/0286227 A1 | 10/2018 | Sorgatz | |
| 2020/0307621 A1* | 10/2020 | Ostrowski | G07C 5/008 |

FOREIGN PATENT DOCUMENTS

| | | |
|---|---|---|
| DE | 10 2010 041 616 A1 | 10/2011 |
| DE | 10 2010 039 675 A1 | 3/2012 |
| DE | 10 2011 108 385 B3 | 6/2012 |
| DE | 10 2012 006 068 A1 | 9/2013 |
| DE | 10 2013 224 896 A1 | 6/2015 |
| DE | 10 2015 202 845 A1 | 8/2015 |
| DE | 10 2014 209 851 A1 | 11/2015 |
| DE | 10 2015 113 648 A1 | 3/2016 |
| DE | 10 2015 116 600 A1 | 4/2016 |
| DE | 10 2015 217 538 A1 | 3/2017 |
| DE | 10 2015 016 349 A1 | 4/2017 |
| DE | 20 2017 105 595 U1 | 10/2017 |
| DE | 10 2018 104 773 A1 | 9/2019 |
| EP | 2 692 604 A1 | 2/2014 |
| WO | WO 2011/066468 A1 | 6/2011 |

OTHER PUBLICATIONS

German-language Written Opinion (PCT/ISA/237) issued in PCT Application No. PCT/EP2019/055137 dated Jun. 24, 2019 (five pages).

German-language Search Report issued in German Application No. 10 2018 203 975.5 dated Sep. 21, 2018 with partial English translation (14 pages).

German-language Search Report issued in German Application No. 10 2018 203 972.0 dated Aug. 13, 2018 with partial English translation (13 pages).

German-language Search Report issued in German Application No. 10 2018 203 974.7 dated Mar. 23, 2020 with partial English translation (13 pages).

German-language Search Report issued in German Application No. 10 2018 203 973.9 dated Nov. 29, 2018 with partial English translation (13 pages).

* cited by examiner

METHOD, SYSTEM, AND VEHICLE FOR PREPARING AN ENERGY FORECAST AND DETERMINING AN OPTIMIZED DRIVING BEHAVIOR WITH RESPECT TO THE ENERGY FORECAST

BACKGROUND AND SUMMARY OF THE INVENTION

The disclosure concerns a driver assistance method for a vehicle, a driver assistance system and a vehicle, in particular a hybrid or electric vehicle, comprising such a driver assistance system. The present disclosure concerns in particular reducing a traveling time and/or an energy consumption of a hybrid or electric vehicle for a specific route.

In vehicles, range and energy forecasts can be prepared and used to inform a driver as to whether a destination can be reached with the available energy reserves. For example, in the course of activated navigation on the basis of an energy consumption forecast and an actual consumption of a journey, recommendations for reactive actions can be output to the driver in order to be able to reach a destination or a charging station.

Thus, DE 10 2010 039 675 A1 describes a method for operating an electrically driven motor vehicle in which a route to a previously input destination is determined by means of a navigation device. Subsequently, it is checked on the basis of the specific route, a detected state of charge of a battery and a detected energy consumption whether the destination will be reached or there is a range gap with respect to the destination. If it is found that there is a range gap, it is ascertained whether the destination will be reached in a prescribed energy-saving mode, in which the energy consumption is lowered, with a corresponding recommendation for action to activate the energy-saving mode being output to the driver.

Such a reactive function, which comes into effect when there is a deviation from the original range forecast in order for an already planned destination still to be reached, cannot however prevent unnecessary charging stops and cannot guarantee optimality under the constraints considered. It will only ever be the case that a planned destination or a charging stop is reached. In other words, there is no proactive optimization of the costs, the energy consumption and/or the traveling time.

An object of the present disclosure is to improve energy management of a vehicle. In particular, an object of the present disclosure is to provide a driver assistance method for a vehicle, a driver assistance system and a vehicle, in particular a hybrid or electric vehicle, that can reduce an energy consumption and for example lower costs and reduce an overall traveling time.

This object is achieved by the subject matter of the independent claims. Advantageous refinements of the invention are specified in the subclaims.

According to one aspect of the present disclosure, a driver assistance method for a vehicle is provided. The driver assistance method comprises preparing an energy forecast for a route on the basis of an anticipated driver behavior, determining an optimized driving behavior with respect to the energy forecast (for example with respect to the energy requirement and/or the associated time requirement) and/or energy consumption, for example for the current route or an alternative route, and outputting a recommendation for action on the basis of the optimized driving behavior and/or energy consumption. According to embodiments, the optimized driving behavior may correspond to the optimized energy consumption and/or optimized costs and/or an optimized traveling time. The optimized driving behavior may relate in particular to a speed, an acceleration (for example a minimum acceleration, a maximum acceleration or positive and negative accelerations) and/or a routing. According to embodiments, the driving behavior does not relate exclusively to the driving style, such as the choice of speed, but also to the choice of route.

In particular, a potential between an expected driver behavior and the route-specifically optimum behavior, for example with regard to costs and/or an overall traveling time, may be determined. A back-calculation to a feasible recommendation for action for the driver or a driving function (in the case of (partially) automated driving mode) takes place, it being possible for the recommendation for action to be output for example at the beginning of a journey or when there are significant changes in external conditions, such as the traffic situation, and consequently the energy forecast.

According to the invention, a proactive indication of an optimum (more optimum) driving (driver) behavior takes place, such as for example of an optimized cruising speed. The overall traveling time and/or the costs can be reduced by such early and optimum recommendations for action. In particular, by reducing the overall traveling time and/or the energy consumption, unnecessary charging stops can be avoided.

In typical embodiments, the anticipated driver behavior can be derived from a learned driver model. In particular, the vehicle can collect data about the driving (driver) behavior of the driver, such as for example about accelerating operations, braking operations, cruising speeds and the like. These data can be used to prepare an individual (behavior) profile of the driver. Thus, for example, an expected speed value with which the driver will drive on a specific section of a route, such as for example a freeway, can be predicted. The recommendation for action may specify a behavior deviating from this anticipated behavior, such as for example a reduced speed. The prediction of the driver behavior and the recommendation for proactive action allows an energy consumption to be reduced, whereby for example costs and an overall traveling time can be reduced and unnecessary charging or refueling stops can be avoided.

According to some embodiments, the optimized driving behavior, such as for example the optimized energy consumption, is determined on the basis of fleet dynamics of a multiplicity of vehicles, that is to say a fleet. The fleet dynamics may comprise dynamic parameters (for example speeds and accelerations) and/or energy consumption data of the multiplicity of vehicles for the route or sections of the route. The data may be collected centrally. In particular, a probability distribution of the dynamic parameters and/or of the energy consumption of the vehicles of the fleet may be prepared for each section of a route (or for each segment of a section divided into a number of segments). The optimized energy consumption may be determined from the fleet data, and in particular the probability distribution, and the recommendation for action for the driver or the driving function may be derived from that.

In some embodiments, one or more vehicle parameters of the vehicle for the determination of the energy forecast are learned or determined in the vehicle and/or of the optimized driving behavior are learned or determined from the fleet dynamics. In other words, necessary vehicle parameters, such as for example a driving resistance parameter and/or vehicle efficiency parameter, may be learned in the vehicle and included in the calculation of the energy consumption.

Typically, the anticipated driver behavior from the learned driver model is correlated with the fleet dynamics in order to determine the optimum driving behavior, such as the optimized energy consumption. For example, a position of the driver behavior in the probability distribution of the dynamic parameters can be determined and a saving potential derived from it.

In some embodiments, the route comprises a number of sections. The energy forecast and the optimized driving behavior, such as the optimized energy consumption, may be determined on the basis of energy forecasts or optimized energy consumptions of the individual sections. The energy forecasts of the individual sections may be added together to obtain the (overall) energy forecast for the route. Similarly, the optimized energy consumptions of the individual sections may be added together to obtain the optimized (overall) energy consumption for the route. Route characteristics or route parameters of the individual sections, such as for example an incline and/or a speed restriction, may be taken into account or used for the energy forecast and the optimized driving behavior.

According to some embodiments, the recommendations for action may be different for at least some of the sections. In other words, different recommendations for action may be output for different sections of the overall route. Thus, a first recommendation for action may be output for a first section and a second recommendation for action, which is different from the first recommendation for action, may be output for the second section.

Typically, the route is a route between a current location of the vehicle and a destination of the vehicle. In particular, the route may be set in a navigation system. Consequently, use for example of inclines and/or speed limits on the route is possible. According to the invention, an energy-related route calculation may therefore take place, and a recommendation for action deviating from the anticipated driver behavior may be output to the driver and/or to a driving function. In other words, the routing function of the navigation system may be coupled to the energy consumption management.

For example, values of the dynamic parameters (for example speeds and accelerations) and/or energy consumption data of the multiplicity of vehicles of the fleet for a multiplicity of sections of a route may be stored in the navigation system or the map of the same, in order that the energy forecast for the input route can take place while additionally taking into account the driver model. One or more additional variables may be included in the energy forecast, such as environmental variables (temperature, incline, etc.) and/or vehicle variables (efficiency, mass, etc.).

In some embodiments, the recommendation for action is output before or at the beginning of a journey, for example after the driver has input a destination into the navigation system. In addition or as an alternative, the recommendation for action may be output during the journey. For example, the recommendation for action may be a recommendation for adaptive action. Thus the recommendation for action may be output when it is determined that a situation in the surrounding environment of the vehicle, in particular a traffic situation, has changed and/or the actual consumption deviates from the energy forecast, for example due to a more inefficient driving style.

According to some embodiments, the recommendation for action is selected from the group comprising a cruising speed, an acceleration (positive and negative acceleration; maximum and/or minimum acceleration), an alternative route and a changed vehicle operating strategy. The recommendation for action may comprise one or more elements of this group. The vehicle operating strategy may for example comprise an energy-saving mode and/or an operating mode (for example electric mode). The recommendation for action may be output to the driver visually and/or acoustically by way of an output unit. The visual recommendation for action may comprise or be an indication on a display. The acoustic recommendation for action may comprise or be a voice output by way of a loudspeaker.

Typically, the driver assistance method is performed completely by the vehicle, such as for example a processor in the vehicle, or a server outside the vehicle. Alternatively, the driver assistance method may be performed partially by the vehicle and partially on a server outside the vehicle. For example, the fleet dynamics may be determined by the server, and the driver model may be learned by the vehicle.

According to another aspect of the present disclosure, a driver assistance system is provided. The driver assistance system comprises a controller, which is configured for preparing an energy forecast for a route on the basis of an anticipated driver behavior and determining an optimized driving behavior with respect to the energy forecast and/or optimized energy consumption, and an output unit, for example a visual and/or acoustic output unit, for outputting a recommendation for action on the basis of the optimized driving behavior and/or optimized energy consumption to the driver or to a driving function. The driver assistance system may in particular be designed to perform the driver assistance method according to the embodiments described here.

According to yet another aspect of the present disclosure, a vehicle, in particular an electric or hybrid vehicle, comprising the driver assistance system according to the embodiments described here is provided.

Exemplary embodiments of the disclosure are described in more detail below and are represented in the figures.

Unless indicated otherwise, the same designations are used below for elements that are the same or have the same effect.

DETAILED DESCRIPTION OF THE DRAWINGS

Figure 1:
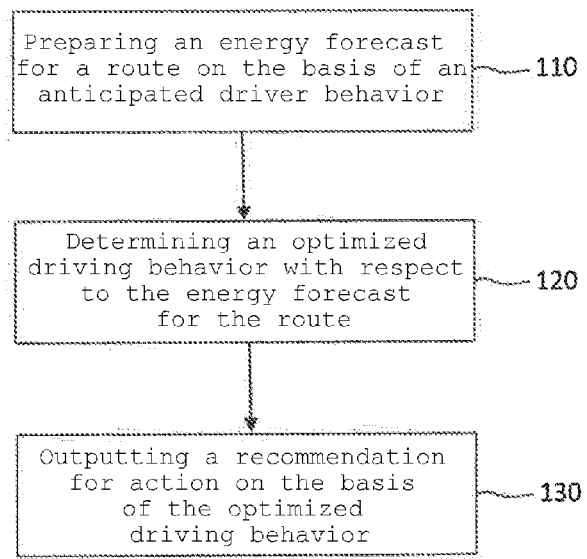
FIG. 1 is a flow diagram of a driver assistance method for a vehicle according to embodiments of the present disclosure.

FIG. 1 shows a flow diagram of a driver assistance method 100 for a vehicle, such as for example a hybrid or electric vehicle, according to embodiments of the present disclosure.

The driver assistance method 100 comprises in block 110 preparing an energy forecast for a route on the basis of an anticipated driver behavior, in block 120 determining an optimized driving behavior with respect to the energy forecast and/or optimized energy consumption for the route, and in block 130 outputting a recommendation for action on the basis of the optimized driving behavior or optimized energy consumption. Typically, the optimized driving behavior is determined on the basis of the optimized energy consumption or corresponds to the optimized energy consumption. According to the invention, a proactive determination and indication of an optimum driving behavior, such as for example an optimum cruising speed, takes place. The overall traveling time and/or the costs can be reduced on account of such early and optimum recommendations for action. In particular, by reducing the overall traveling time and/or the energy consumption for each route, unnecessary charging stops can be avoided.

The expression "anticipated driver behavior", as it is used in the present disclosure, relates to a prediction of a behavior of a specific driver on the basis of a driver model. For example, it may be determined that the driver will, with a certain probability, drive at a specific speed on a specific route. Consequently, a probable energy consumption can be derived and an energy forecast for the route tailor-made for this specific driver can be prepared. In other words, the energy forecast takes an individual driver behavior into account. The individual driver behavior may be learned or otherwise stored in the driver assistance system, for example by manual input of the driver (for example a preferred cruising speed on specific types of road, such as freeways and highways).

For preparing the driver model, a multiplicity of values of at least one driver-specific dynamic parameter of the vehicle or of the driver of the vehicle may be collected. The at least one driver-specific dynamic parameter may be selected from a group comprising an acceleration and a speed.

According to some embodiments, the values of the driver-specific dynamic parameters that are collected or measured by the vehicle may be assigned to one or more categories, the categories being selected from the group comprising a location category and a time category. In other words, the values of the driver-specific dynamic parameters are categorized according to the circumstances under which they were measured or collected and are selectively used according to their category in the preparation of the energy forecast, whereby the precision of the energy requirement, and consequently of the range forecast, can be increased.

Typically, the location category includes a number of subcategories, to which the values of the driver-specific dynamic parameters are assigned, it being possible for the subcategories to be defined according to road types and road environments with traffic control. The road types may for example comprise urban roads, highways and freeways. The road environments with traffic control may for example include speed restrictions, intersections, junctions, traffic light circuits, pedestrian crosswalks and the like. A value may be assigned to a number of subcategories.

For preparing the energy forecast for the section of a route, values of the driver-specific dynamic parameters from those subcategories of the location category to which the section corresponds may be used. If the section of road is for example a freeway, values of the driver-specific dynamic parameters from the "freeway" subcategory are then used for preparing the energy forecast for the section.

Typically, the time category includes a number of subcategories, to which the values of the driver-specific dynamic parameters are assigned, wherein the subcategories are defined according to the time of day, a day of the week and optionally a time of year. A value may be assigned to a number of subcategories.

For preparing the energy forecast for the section of a route, the values of the driver-specific dynamic parameters from those subcategories of the time category to which the point in time at which the section is driven along by the vehicle corresponds may be used. If for example the section of road is driven over on a Thursday, values of the driver-specific dynamic parameters from the "Thursday" subcategory are then used for preparing the energy forecast.

In some embodiments, only those values of the driver-specific dynamic parameters that are contained in all of the relevant categories may be used for preparing the energy forecast for the section. If, for example, a freeway is driven over on a Thursday, only the values that are assigned to the "Thursday" subcategory and also the "freeway" subcategory are then used.

In some embodiments, the route comprises a number of sections. In other words, the route may be divided into a multiplicity of sections. The energy forecast may be determined on the basis of energy forecasts of the individual sections. The energy forecasts of the individual sections may be added together in order to obtain the (overall) energy forecast for the route. Similarly, the optimized energy consumption may be determined on the basis of optimized energy consumptions of the individual sections (in other words, the optimized driving behavior may be determined on the basis of the optimized energy consumption or the optimized energy consumptions). In particular, the optimized energy consumptions of individual sections may be added together in order to obtain the optimized (overall) energy consumption for the route.

According to some embodiments, a first recommendation for action may be output for a first section and a second recommendation for action, which is different from the first recommendation for action, may be output for the second section. In other words, the recommendations for action, such as for example recommendations for a cruising speed, may be different for at least some of the sections. For example, the recommendation for action may be a recommendation for adaptive action. Thus, the recommendation for action may be output when it is determined that a situation in the surrounding environment of the vehicle, in particular a traffic situation, has changed. For example, an indication of time advantages and changes of behavior that are possible given the current traffic may take place.

In some embodiments, the recommendation for action is output before or at the beginning of a journey, for example after the driver has input a destination into the navigation system. In addition or as an alternative, the recommendation for action may be output during the journey. For example, the recommendation for action may be a recommendation for adaptive action. Thus, the recommendation for action may be output when it is determined that a situation in the surrounding environment of the vehicle, in particular a traffic situation, has changed. For example, an indication of time advantages and changes of behavior that are possible given the current traffic may take place.

According to some embodiments, the recommendation for action is selected from the group comprising an (optimum or optimized) cruising speed, a maximum acceleration and an alternative route. In the case of an alternative route, the optimized energy consumption that is determined in block 120 may relate to the alternative route. In the case of recommendations for action for the same route, the optimized energy consumption may relate to this route, that is to say to the route for which the energy forecast was prepared in block 110.

Figure 2:
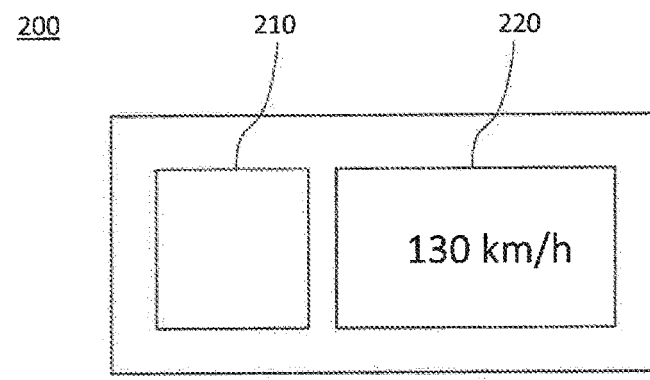
FIG. 2 shows a driver assistance system according to embodiments of the present disclosure.

FIG. 2 shows a driver assistance system 200 according to embodiments of the present disclosure. The driver assistance system 200 may in particular be designed to perform the driver assistance method according to the embodiments described here. The driver assistance system 200 may be integrated in a vehicle, for example an electric or hybrid vehicle. However, the present disclosure is not restricted to this and the driver assistance method according to the embodiments described here may be performed outside the vehicle, such as for example on a server in the backend.

The driver assistance system 200 comprises a controller 210, which is configured for preparing an energy forecast for a route on the basis of an anticipated driver behavior and determining an optimized driving behavior with respect to the energy forecast and/or optimized energy consumption, and an output unit 220 for outputting a recommendation for action on the basis of the optimized driving behavior determined by the controller 210 and/or optimized energy consumption.

According to some embodiments, the output unit 220 comprises a visual and/or acoustic output unit. The visual output unit may be a display, such as for example an LCD display. The acoustic output unit may comprise at least one loudspeaker, by way of which a voice output can take place. In FIG. 2, a display on which a cruising speed of 130 km/h is indicated as a recommendation for action is shown by way of example.

In some embodiments, the recommendation for action may be output to a device of the vehicle that is designed for an automatic or partially automatic driving mode of the vehicle, and performs this mode. The device may be a partially (automatic) driving function of the vehicle, such as for example a cruise control.

Figure 3:
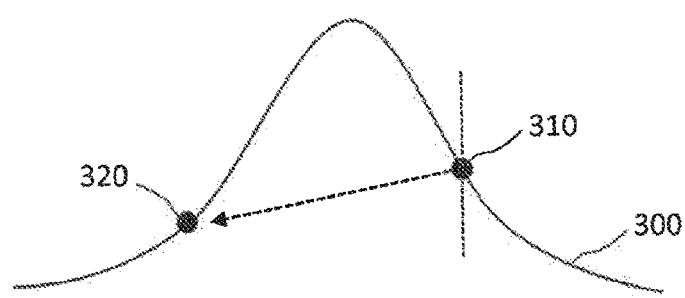
FIG. 3 shows a determination of an optimized energy consumption and of a recommendation for action according to embodiments of the present disclosure.

FIG. 3 shows a determination of an optimized energy consumption and a recommendation for action according to embodiments of the present disclosure.

According to embodiments, the driver behavior may be derived from a driver model. The driver model may be a driver model learned by the vehicle over time from the driver behavior of the driver. The driver behavior may be derived from driver-specific dynamic parameters, such as an acceleration and/or a speed, for example on specific types of road and/or in specific situations (for example day, night, etc.). As an alternative, the driver model may be stored otherwise in the vehicle assistance system, for example by manual input of the driver. For example, the driver may set a preferred cruising speed on specific types of road, such as freeways, highways and urban roads.

For preparing the learned driver model, the vehicle may continuously collect data (for example dynamic information) about the driving (driver) behavior of the driver, such as for example about accelerating operations, braking operations, cruising speeds and the like. The driver model may be continuously updated or supplemented, so that it becomes ever more precise as time goes by. Consequently, the driver behavior can be predicted more accurately for the energy forecast, whereby the energy forecast also becomes more precise.

According to some embodiments, the optimized driving behavior and/or the optimized energy consumption is determined on the basis of fleet dynamics of a multiplicity of vehicles, that is to say a fleet. The fleet may include a multiplicity of vehicles of the same and/or a similar type as the vehicle of the driver referred to ("ego vehicle"). The fleet may in particular comprise a multiplicity of other vehicles and optionally the ego vehicle.

The fleet dynamics may comprise dynamic parameters (for example speeds and accelerations) and/or energy consumption data of the multiplicity of vehicles for the route or sections of the route. The vehicles of the fleet may send the dynamic parameters and/or energy consumption data to a central unit, for example the vehicle manufacturer. The fleet data required for the determination of the energy forecast and the optimized driving behavior/energy consumption, such as for example the dynamic parameters and/or energy consumption data for each section of the route, may be stored in the navigation system during manufacture and/or be updated one or more times over the operating time of the vehicle. The updating may take place in the course of a service or online.

The optimized energy consumption or the optimized driving behavior may for example be determined by a comparison of the fleet dynamics with the learned driver dynamics and the recommendation for action for the driver derived from it, as explained below.

Typically, for the route or section of the route, the data of the vehicles of the fleet are used in order to prepare a probability distribution, which indicates how probable a specific dynamic parameter and/or energy consumption is for this route or an individual section of the route.

FIG. 3 shows the learned fleet dynamics or energy forecast. In particular, a probability distribution 300 for a dynamic parameter of the fleet (or an energy consumption) for a section or a segment of the section of the route is shown.

The anticipated driver behavior may be correlated with the fleet dynamics, for example by comparison of the dynamic parameters of the fleet with the driver-specific dynamic parameters. In particular, a position 310 of the driver behavior in the probability distribution 300 can be determined and the energy forecast, which is individual to the driver, derived from it. Subsequently, a saving potential, that is to say the optimized driving behavior or the optimized energy consumption can be determined, as is indicated by the arrow at the point 320 on the probability distribution 300. Consequently, a freedom of action on a section of the route ascertained on the basis of the fleet can be taken into account.

On the basis of the specific optimized driving behavior or the optimized energy consumption, a recommendation for action that is suitable for example for achieving the optimized energy consumption, such as for example a reduced cruising speed, may be output. The reduced cruising speed may in this case be taken from the dynamic parameters of the fleet. For example, the recommendation for action may correspond to a fleet speed at the point 320.

The optimized energy consumption may be, but does not have to be, the optimum (that is to say minimum) energy consumption. The optimized energy consumption may depend on one or more parameters. For example, the driver may have set in the navigation system that the route should not use the freeway. In such a case, a specific optimized energy consumption for a route without the freeway may be determined, even if routing via the freeway would make even lower energy consumption possible.

Figure 4:
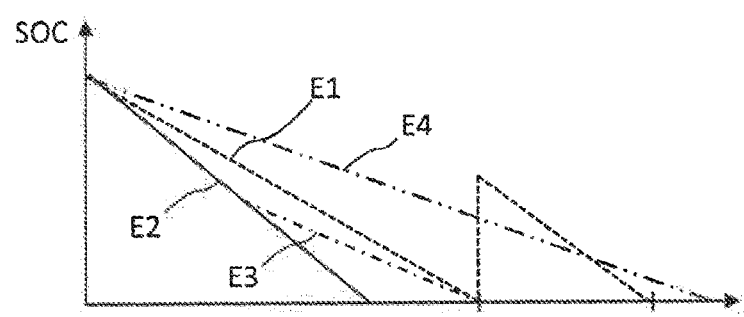
FIG. 4 shows a comparison between a reactive behavior and the proactive behavior according to embodiments of the present disclosure.

FIG. 4 shows a comparison between a reactive method and the proactive method according to the embodiments of the present disclosure. The x axis of the graph shown in FIG. 4 indicates a distance, and the y axis indicates energy reserves of the vehicle, such as for example a state of charge SOC of a high-voltage accumulator of a hybrid or electric vehicle.

In FIG. 4, E1 indicates by way of example an energy forecast without driver influence and E2 indicates a deviating energy forecast with driver influence. The driver influence has the effect of reducing the range of the vehicle. In the case of a reactive method, in the course of activated navigation, recommendations for reactive action are output to the driver in response to a deviation of an energy consumption forecast and an actual consumption of a journey, in order to be able to reach a destination or a charging station (energy forecast E3). In other words, the energy forecast is reduced to a fixed (interim/charging) destination. At the charging stop (see charging stroke at the vertical dashed line in FIG. 4), a certain time passes for charging the high-voltage accumulator. In the case of the proactive method according to the invention, on the other hand, a further proactive reduction of the energy consumption takes place (energy forecast E4), so that fewer additional charging stops, or even no additional charging stop at all, are required before reaching the destination.

According to the embodiments described here, a proactive indication of an optimum driving behavior, such as for example an optimum cruising speed, takes place. The overall traveling time and/or the costs may be reduced by these early and optimum recommendations for action. In particular, charging stops can be avoided by a reduction of the overall traveling time and/or the energy consumption.

Although the invention has been illustrated more specifically and explained in detail by preferred exemplary embodiments, the invention is not restricted by the disclosed examples and other variations can be derived therefrom by a person skilled in the art without departing from the scope of protection of the invention. It is therefore clear that a multiplicity of possibilities for variations exist. It is likewise clear that embodiments mentioned by way of example only represent examples which are not to be considered in any way as limiting the range of protection, the possibilities for applications or the configuration of the invention.

Instead, the preceding description and the description of the figures enable a person skilled in the art to implement in practice the embodiments given by way of example, while the person skilled in the art, knowing the disclosed concept of the invention, can carry out various changes, for example with regard to the function or the arrangement of individual elements mentioned in an embodiment given by way of example, without departing from the scope of protection that is defined by the claims and their legal equivalents, such as for instance further explanations in the description.

What is claimed is:

1. A driver assistance method for a vehicle, comprising:
   preparing an energy forecast for a route on the basis of an anticipated driver behavior, which relates to a prediction of a behavior of a specific driver;
   determining an optimized driving behavior with respect to the energy forecast and the associated time requirement, wherein the optimized driving behavior is determined by identifying a first position of the behavior of the specific driver within a probability distribution of a fleet dynamic of a plurality of vehicles based on the anticipated driver behavior, and identifying a second position within the probability distribution of the fleet dynamic of the plurality of vehicles to which to move the behavior of the specific driver; and
   outputting a recommendation for action on the basis of the optimized driving behavior, wherein the recommendation for action corresponds to the fleet dynamic at the second position within the probability distribution of the fleet dynamic of the plurality of vehicles.

2. The driver assistance method according to claim 1, wherein
   a parameter is determined as the optimized driving behavior, wherein the parameter influences a driving style and/or a routing.

3. The driver assistance method according to claim 1, wherein
   costs and/or traveling time are taken into account for determining the optimized driving behavior with an aim of avoiding charging stops.

4. The driver assistance method according to claim 1, wherein
   the anticipated driver behavior is derived from a learned driver model.

5. The driver assistance method according to claim 1, further comprising:
   determining one or more vehicle parameters of the vehicle for the determination of the energy forecast and/or the optimized driving behavior.

6. The driver assistance method according to claim 1, wherein
   the route comprises a number of sections, and
   the energy forecast and the optimized driving behavior are determined on the basis of energy forecasts or optimized energy consumptions of the individual sections and their route characteristics.

7. The driver assistance method according to claim 6, wherein
   the route is a route between a current location of the vehicle and a destination of the vehicle.

8. The driver assistance method according to claim 1, wherein
   the recommendation for action is output to the driver, or
   the recommendation for action is output to a device of the vehicle that is designed for an automatic or partially automatic driving mode of the vehicle.

9. The driver assistance method according to claim 1, wherein
   the recommendation for action is output when at least one of: it is determined that a situation in a surrounding environment of the vehicle has changed, and an actual energy consumption deviates from the energy forecast; and
   the recommendation for action is selected from the group comprising: a cruising speed, an acceleration, an alternative route, a changed vehicle operating strategy, and any combination thereof.

10. The driver assistance method according to claim 9, wherein
    the changed situation is a traffic situation.

11. The driver assistance method according to claim 1, wherein
    the driver assistance method is performed completely by the vehicle or a server outside the vehicle, or
    the driver assistance method is performed partially by the vehicle and partially on a server outside the vehicle.

12. A driver assistance system, comprising:
    a controller, which is configured for:
    preparing an energy forecast for a route on the basis of an anticipated driver behavior, which relates to a prediction of a behavior of a specific driver, and
    determining an optimized driving behavior with respect to the energy forecast and a time requirement, wherein the optimized driving behavior is determined by identifying a first position of the behavior of the specific driver within a probability distribution of a fleet dynamic of a plurality of vehicles based on the anticipated driver behavior, and identifying a second position within the probability distribution of the fleet dynamic of the plurality of vehicles to which to move the behavior of the specific driver; and an output unit for outputting a recommendation for action on the basis of the optimized driving behavior, wherein the recommendation for action responds to the fleet dynamic at the second position within the probability distribution of the fleet dynamic of the plurality of vehicles.

13. A vehicle comprising the driver assistance system according to claim 12.

14. The vehicle according to claim 13, wherein the vehicle is an electric or hybrid vehicle.

* * * * *